United States Patent
Weigold et al.

(10) Patent No.: US 9,651,135 B2
(45) Date of Patent: May 16, 2017

(54) GEAR UNIT OF A MOTOR VEHICLE ACTUATING DRIVE

(71) Applicant: Brose Fahrzeugteile GmbH & Co. KG, Wuerzburg, Wuerzburg (DE)

(72) Inventors: Thomas Weigold, Bamberg (DE); Alexander Kifer, Mistelbach (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 125 days.

(21) Appl. No.: 14/180,820

(22) Filed: Feb. 14, 2014

(65) Prior Publication Data

US 2015/0233461 A1 Aug. 20, 2015

(51) Int. Cl.
*F16B 21/16* (2006.01)
*F16H 57/00* (2012.01)
*F16H 57/023* (2012.01)
*E05F 15/697* (2015.01)
*F16H 1/16* (2006.01)
*F16B 21/18* (2006.01)

(52) U.S. Cl.
CPC ....... *F16H 57/0031* (2013.01); *E05F 15/697* (2015.01); *F16H 57/023* (2013.01); *F16B 21/16* (2013.01); *F16B 21/183* (2013.01); *F16H 1/16* (2013.01); *F16H 57/0025* (2013.01); *Y10T 74/19828* (2015.01)

(58) Field of Classification Search
CPC ..... F16B 21/16; F16B 21/183; F16H 57/0025
USPC ............................ 74/446, 451, 425; 403/366
See application file for complete search history.

(56) References Cited

U.S. PATENT DOCUMENTS

| | | | | |
|---|---|---|---|---|
| 1,157,666 A | * | 10/1915 | Bennett ................... | B23P 11/00 29/432 |
| 1,490,649 A | * | 4/1924 | Vanderbeek .............. | F16D 1/12 403/290 |
| 1,655,278 A | * | 1/1928 | Mansur .................... | F16H 55/06 74/446 |
| 3,635,100 A | * | 1/1972 | Littmann ............... | F16D 41/206 464/97 |
| 3,805,552 A | * | 4/1974 | Heald ..................... | F16C 29/02 376/285 |

(Continued)

FOREIGN PATENT DOCUMENTS

| | | | |
|---|---|---|---|
| DE | 197 06 872 A1 | 8/1998 | |
| DE | 198 12 875 C1 | 6/1999 | |
| DE | 10 2006 017 930 A1 | 10/2007 | |
| DE | 10 2008 043 304 A1 | 1/2010 | |
| DE | 10 2009 047 519 A1 | 6/2011 | |
| DE | 10 2011 003 633 A1 | 8/2012 | |
| JP | U-53-1646 | * 6/1976 | |
| JP | B2-63-53406 | * 10/1988 | |
| JP | Y2-7-9095 | * 3/1995 | ............... G01P 1/04 |
| JP | Y2-7-38754 | * 9/1995 | ............. F16H 55/06 |
| JP | 2001065666 A | * 3/2001 | ............. F16H 55/17 |
| JP | A-2001-65666 | * 3/2001 | ............. F16H 55/17 |
| JP | 2013-108 549 A | 6/2013 | |
| JP | 2013108549 A | * 6/2013 | ............... F16H 1/16 |
| JP | A-2013-108549 | * 6/2013 | ............... F16H 1/16 |

OTHER PUBLICATIONS

Machine translation of JP 2001065666 A.*

*Primary Examiner* — William Kelleher
*Assistant Examiner* — Randell J Krug
(74) *Attorney, Agent, or Firm* — Muncy, Geissler, Olds & Lowe, P.C.

(57) ABSTRACT

A gear unit for an actuating drive, in particular a window lifter drive, of a motor vehicle is provided that includes a gear housing and a pivot bolt rotatably fixedly connected thereto for rotatably supporting a gear wheel, in particular of a worm gear, the pivot bolt has a second pivot section, which is adjacent to a first pivot section having a first outer diameter, and which has a free end section on the front, the outer diameter of the second pivot section being smaller than the outer diameter of the first pivot section at least over one part of it pivot section length.

9 Claims, 4 Drawing Sheets

(56) References Cited

U.S. PATENT DOCUMENTS

| | | | | |
|---|---|---|---|---|
| 3,865,500 | A | * | 2/1975 | Newell .................... F16D 1/104 16/422 |
| 4,799,403 | A | | 1/1989 | Dinkel et al. |
| 4,919,562 | A | * | 4/1990 | Anthony ............... B25B 27/062 403/16 |
| 6,155,136 | A | | 12/2000 | Telly et al. |
| 8,286,525 | B2 | * | 10/2012 | Okabe .................... B21H 5/005 74/440 |
| 8,316,733 | B2 | * | 11/2012 | Malone .................... F16D 1/06 474/902 |
| 8,978,502 | B2 | * | 3/2015 | Albrecht ................... F16H 1/16 74/425 |
| 2006/0199652 | A1 | * | 9/2006 | Fuhrmann ................. F16D 1/06 464/158 |
| 2006/0207369 | A1 | * | 9/2006 | Becker ................. B60N 2/2213 74/451 |
| 2006/0291954 | A1 | * | 12/2006 | Igarashi .................. F16D 1/101 403/359.1 |
| 2011/0278125 | A1 | * | 11/2011 | Chevalier ............ B60N 2/0232 192/48.1 |

\* cited by examiner

GEAR UNIT OF A MOTOR VEHICLE ACTUATING DRIVE

BACKGROUND OF THE INVENTION

Field of the Invention

The present invention relates to a gear unit for an actuating drive, in particular a window lifter drive, of a motor vehicle, comprising a gear housing and comprising a pivot bolt which is rotatably fixedly connected thereto to rotatably support a gear wheel, in particular of a worm gear.

Description of the Background Art

A window lifter, in particular a so-called cable window lifter, as the actuating drive of a motor vehicle, usually has an electric motor and a gear in the form of a worm gear, whose worm wheel, which is rotatably supported in the gear housing, has a helical gearing on the circumferential side and which engages with a worm which is disposed on the free shaft end of the motor shaft and fixed to the shaft. The rotation axis of the worm gear of the 90° deflection gear formed thereby is typically formed by a pivot bolt which is rotatably fixedly seated in the gear housing. In the case of the cable window lifter, the worm wheel is usually coupled with a cable drum oriented coaxially to the rotation axis of the worm wheel. The window lifter cable, which, in turn, is connected to the particular vehicle window pane via drivers, is wound several times around the cable drum in order to lift or lower the window pane, depending on the direction of rotation of the actuating drive formed by the electric motor and the gear.

The pivot bolt, onto which the worm wheel and possibly the cable drum are rotatably supported, is typically a steel pin or bolt having ribbing, which is referred to as knurls, on its one end, by means of which the bolt is rotatably fixedly seated on the base of the gear housing. For this purpose, this knurled or ribbed area of the bolt is usually injection-molded with plastic during plastic injection molding of the gear housing.

The manufacture of a pivot bolt of this type is complex and cost-intensive to the extent that, to achieve its required surface condition, the steel pin provided for this purpose as the base body must usually be ground in at least two stages regardless of whether the knurling is introduced into the steel pin before or after the grinding process. The reason for this is that the region or section of the steel pin into which the knurling is introduced, usually has a larger outer diameter than the outer diameter of the pivot section of the steel pin or bolt, which is properly used as the bearing surface for the worm wheel. Accordingly, the steel pin or bolt may not be easily subjected to through-feed grinding. Instead, its bearing surface and knurled section must be ground individually in a cost-intensive special grinding process, for example infeed grinding. Since the surface of the steel bolt is damaged during knurling, a further grinding process is necessary subsequent to the knurling of the corresponding pivot section of the steel bolt in order to achieve the required surface condition.

SUMMARY OF THE INVENTION

It is therefore an object of the present invention to provide a gear unit of the aforementioned type, which comprises a pivot bolt which may be manufactured as economically as possible, for supporting, in particular, a worm wheel of a corresponding actuating drive of a motor vehicle.

For this purpose, it is provided to provide a pivot bolt having at least two axial sections whose outer diameters are different, the outer diameter of the pivot section used to fix the pivot bolt in the housing being smaller than the outer diameter of the pivot section used as the bearing surface at least over one part of its pivot section length. A notching for improved retention of the pivot bolt in the gear housing is suitably introduced in this second pivot section having a comparatively small outer diameter.

The provision of a pivot bolt having a reduced outer diameter in the area of its fixing end permits the comparatively easy and cost-saving through-feed grinding of the pivot bolt and, in particular, its pivot section providing the bearing surface before the notching is carried out in the region of the pivot section of the pivot bolt used as the fixing end. The surface of the pivot bolt is no longer damaged during the notching itself, so that a substantial cost saving in the manufacture of a pivot bolt of this type is achieved overall.

A steel axis made of a solid material, i.e. having a solid design or designed as a tube, i.e., as a cylindrical sleeve, may be used as the base material or base body, whereby the wall thickness should suitably be between 1 mm and 1.5 mm in the case of a corresponding hollow axis. Not only does this help save material costs, but it also reduces the weight of the pivot bolt and the gear unit provided thereby. Regardless of the use of the base body material, a substantial reduction in the manufacturing costs of a pivot bolt of this type is achieved in any case.

The pivot section which is adjacent to the pivot section used to support the worm wheel and ground accordingly for this purpose, and which is used to fix the pivot bolt in the gear housing is, in a suitable embodiment, provided with preferably largely axially running notchings (axial notches), which are disposed, in particular evenly distributed, on the circumferential side of this pivot section.

In addition to these axial notches, two radial notchings (radial notches) are preferably introduced into this pivot section, into its front feed end section. These radial notches, which preferably have a V shape, may run in a secant-like manner or, in particularly also in the shape of a cross, these radial notches extending in the axial direction and conically or frustoconically widening the front free end section. The adjoining region has the reduced outer diameter and only the axial notches in the axial direction up to the pivot section of the pivot bolt forming the bearing surface. In other words, the pivot bolt is practically tapered in this region of the pivot section used for fixing the pivot bolt and extending between the pivot section used as the bearing surface and the free end section having the radial notches.

Overall, therefore, the pivot bolt is provided with a notching in the form of axial and radial grooves in its diameter-reduced pivot section used for fixing in the gear housing, preferably in such a way that a conical or frustoconical free end section is formed. This free end section is widened in the direction of the free end of the bolt. The outer diameter in this region is nevertheless smaller than or at maximum equal to the outer diameter of the pivot section which is used as the bearing surface, in particular for supporting the worm wheel or gear wheel and/or other gear components, for example a cable drum.

The advantages achieved by the invention are, in particular, the fact that the pivot bolt provided with the notching may be manufactured more easily and thus more economically in the mounted state within the gear housing. In addition, the pivot bolt according to the invention has both a higher torsion resistance and a higher pullout resistance than a pivot bolt provided with a knurling in the known manner. To establish the torsional and pullout resistance of the pivot bolt mounted in the housing, i.e., preferably injection molded in the region of its notching, a corresponding force (torsional or tensile force) is applied until the pivot bolt becomes loose, this force being measured. An improvement by a factor of up to two (2) was determined with respect to the torsional resistance and, in particular, with respect to the pullout resistance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
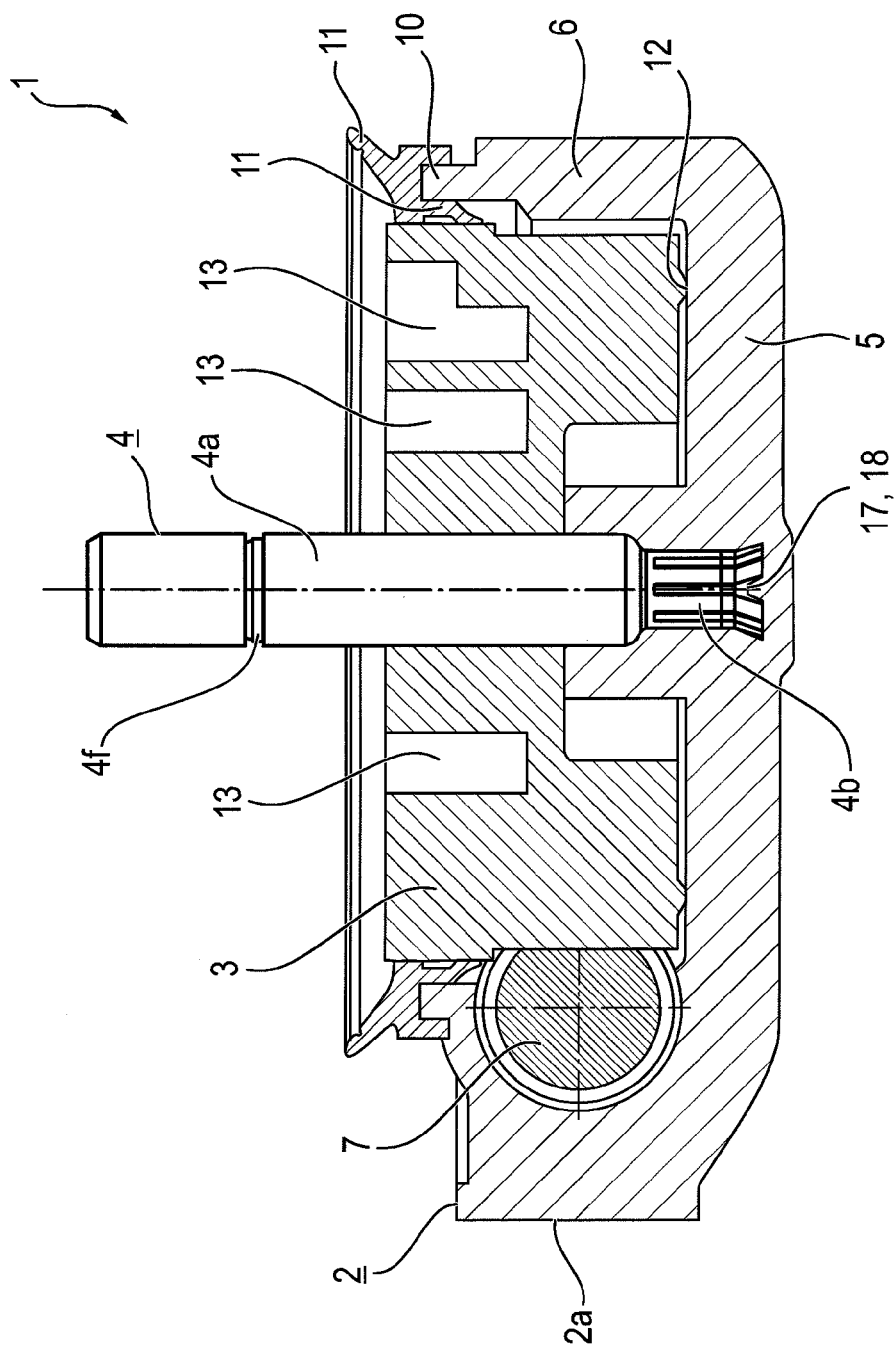
FIG. 1 shows a sectional representation of a gear unit of an actuating drive comprising a pivot bolt provided with a notching, on which a worm wheel is supported.
Figure 2:
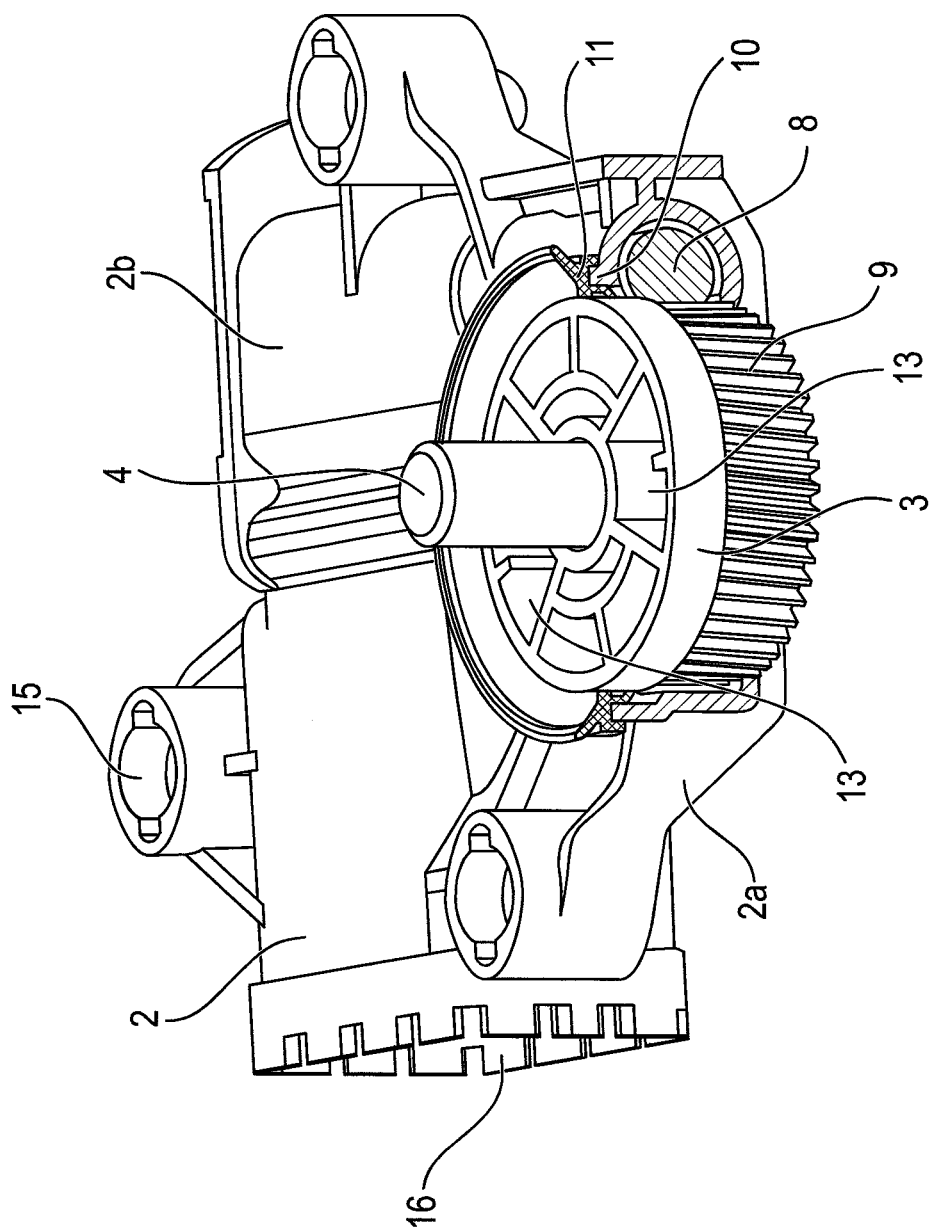
FIG. 2 shows a perspective representation of the gear unit according to FIG. 1, including a partially cut away gear housing.

FIGS. 1 and 2 show a sectional representation and a perspective representation, respectively, of a gear unit 1 comprising a housing section 2a of a gear housing 2, which accommodates a worm wheel 3 as the gear wheel, which is rotatably supported around a pivot bolt. 4. Gear housing 2, or this housing section 2a, is formed by a housing base 5 and housing side walls 6 extending perpendicularly thereto, pivot bolt 4, which is designed as a steel pin or steel bolt, a solid element or as a hollow cylinder, projects partially out of housing section 2a from housing base 5, extending perpendicularly thereto, and is rotatably fixedly anchored in housing base 5. Pivot bolt 4 is used as a rotation axis for worm wheel 3 and possibly for a cable drum, which is not illustrated herein.

A driving worm 7, which is fixedly connected to the shaft on the shaft end of a motor shaft 8 (FIG. 2) and engages with a helical outer gearing 9 of worm wheel 3, extends over a cylindrical bore hole on the left edge (FIG. 1) and right edge (FIG. 2) of gear housing section 2a. Worm wheel 3 and driving worm 7 form a worm gear, whose reduction ratio is determined by the gearings or worm wheel 3 and driving worm 7.

A sealing ring 11 overlaps an upper housing edge 10 of side wall of housing section 2a in a form-locked and frictionally engaged manner, so that worm wheel 3 is sealed against gear housing 2. Worm wheel 3 has an annular bulge 12 on the base side and is supported thereby on housing base 5 to reduce friction losses. Opposite annular bulge 12, worm wheel 3 has multiple receptacles 13 in the form of recesses, with which corresponding pins or grips of the cable drum engage to connect it to worm wheel 3 in a form-locked manner.

Figure 5:
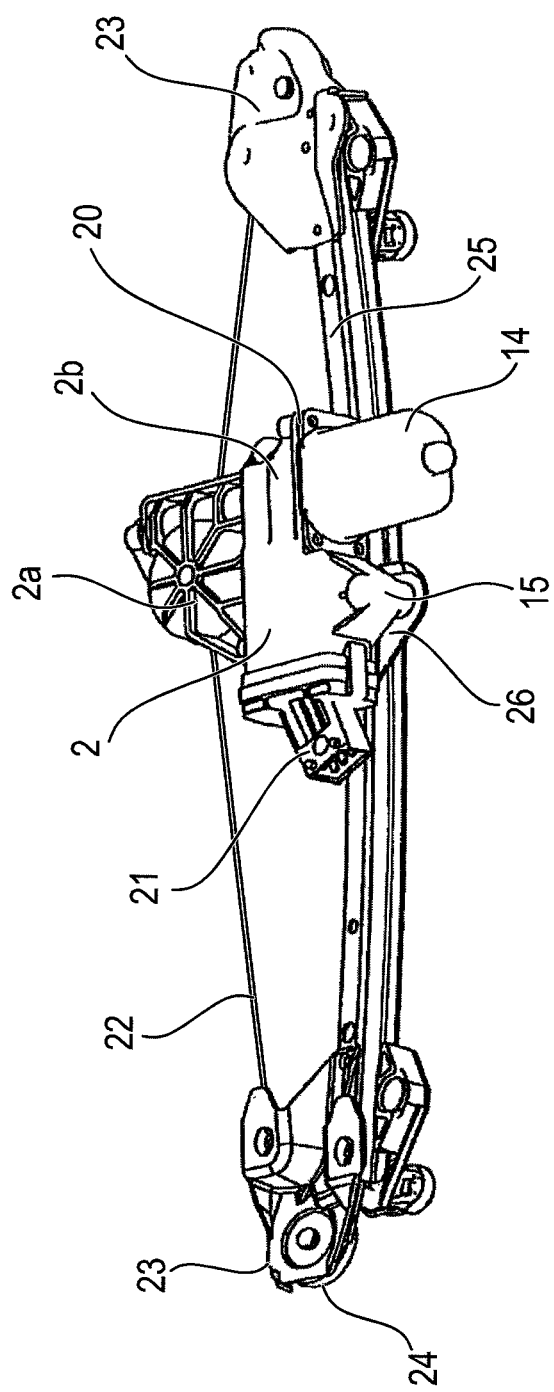
FIG. 5 shows a perspective view of an electromotive cable window lifter having a gear unit according to FIGS. 1 and 2.

As is comparatively clearly apparent in FIG. 2, housing section 2a illustrated in FIG. 1 is located on the front housing end of gear housing 2, which has a motor housing section 2b for fastening an electric motor 14 or its motor housing illustrated in FIG. 5. Multiple fastening regions 15 are provided on gear housing 2 for fastening the actuating drive formed by motor 14 and gear housing 2, for example to a vehicle door. An electronic system (FIG. 5), which controls electric motor 14, may be pushed into gear housing 2 via a push-in opening 16 of gear housing 2. A particularly compact overall structure of the actuating drive is thus provided.

Figure 3:
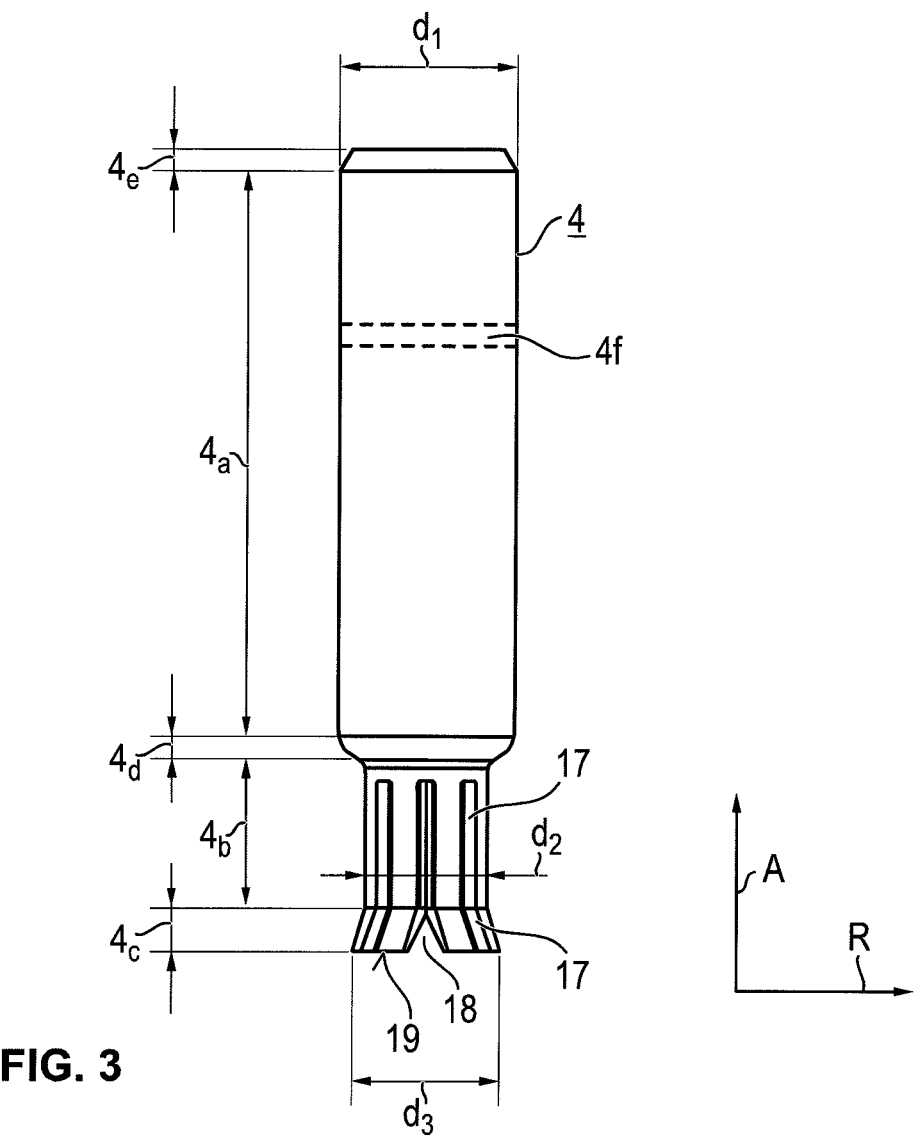
FIGS. 3 and 4 show the pivot bolt having the notching in a side view and a front top view, respectively, of the free end section having the notching.
Figure 4:
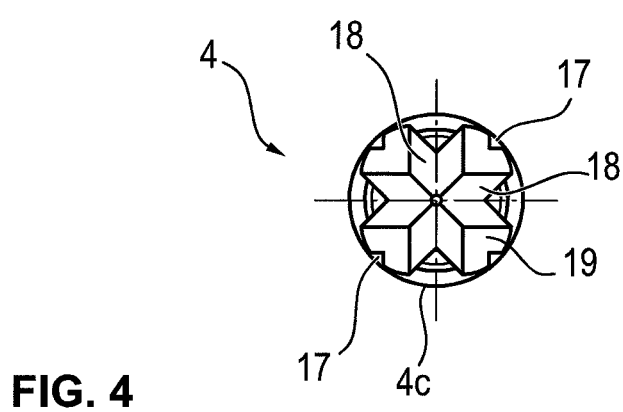

As is comparatively clearly apparent in connection with FIGS. 3 and 4, pivot bolt 4 has a first pivot section 4a, which has a first outer diameter d1, and an adjoining second pivot section 4b in axial direction A—via a chamfered transitional section 4d in the exemplary embodiment—second pivot section 4b having a second outer diameter d2 which is smaller than outer diameter d1 of first pivot section 4a. Second pivot section 4b, which has a comparatively small outer diameter d2, is provided with a notching in the form of axial notches 17, on the one hand, which extend in axial direction A, and radial notches 18, on the other hand, which extend in radial direction R.

After radial notches 18, which are designed in the shape of a cross according to FIG. 4, have been introduced, a frustoconical free end section 4c, which widens conically in the direction of front 19, is provided in the direction of front 19 of this notched pivot section 4b. Maximum outer diameter $d_3$ in the region of end face 19 is preferably also smaller than and otherwise at most the same size as outer diameter $d_1$ of first pivot section 4a of pivot bolt 4, which is used as the bearing surface for worm wheel 3 and possibly the cable drum.

Pivot bolt 4 is rotatably fixedly anchored by this notched pivot section 4b in housing base 5 of gear housing 2 and, in this location, in its housing section 2a. For this purpose, the plastic material of gear housing 2, which is manufactured by injection molding, is also injection-molded around corresponding (second) pivot section 4b as well as preferably a certain axial region of adjoining (first) pivot section 4a, which is used as the bearing surface for worm wheel 3, to thereby rotatably fixedly anchor pivot bolt 4 easily and reliably in gear housing 2 and thus in gear unit 1.

In manufacturing pivot bolt 4, diameter-reduced pivot section 4b is produced by a cutting process initially or following a grinding process of pivot bolt 4, including introduction of chamfered intermediate or transition section 4d as well as a chamfered bolt end section 4e on the bolt end opposite notched free end section 4c on the front. Diameter $d_2$ in this case is approximately 20% to 30% smaller than outer diameter $d_1$ of pivot section 4a ground with the desired or required surface condition. Axial notches 17 are subsequently introduced into this diameter-reduced pivot section 4b. Preferably V-shaped radial notches 18 are then introduced by forming conical or frustoconical free end section 4c on the front for providing desired notching 17, 18.

In the area of (first) pivot section 4a, a circumferential groove 4f, which is indicated only by the dash-dot line in FIG. 3, may be introduced into pivot bolt 4.

A retaining ring (not illustrated) may be introduced into this annular groove 4f to axially secure the cable drum on pivot bolt 4.

FIG. 5 shows a perspective representation of the actuating drive designed as a cable window lifter, comprising gear housing 2 and electric motor 14, whose motor housing is, for example, detachably connected to gear housing 4 via a flange joint 20. Push-in electronic system 21 is inserted into gear housing 21 via push-in opening 16.

The illustrated cable window lifter furthermore comprises a circumferentially guided cable 22, which is deflected in deflection regions 23 with the aid of deflection rollers 24, and whose cable ends are accommodated in cable means receptacles of the cable drum, which is not illustrated, in a manner which is not illustrated in further detail. A base plate, on which gear housing 2 is fixed via its fastening regions 15, is used to fasten the window lifter, which is formed by motor gear unit 2, 14 as the actuating drive, to a guide rail 25 or to a vehicle door module.

The invention is not limited to the exemplary embodiments described above. Instead, other variants of the invention may be derived herefrom by those skilled in the art without going beyond the subject of the invention. Moreover, in particular, all individual features described in connection with the exemplary embodiments may also be otherwise combined with each other without going beyond the subject of the invention.

What is claimed is:

1. A gear unit for an actuating drive of a motor vehicle, the gear unit comprising:
    a gear housing;
    a pivot bolt rotatably fixedly connected to the gear housing; and
    a gear wheel injection molded onto the pivot bolt, the pivot bolt comprising:
        a first section; and
        a second section adjacent to the first section;
    wherein the first section has an outer diameter and has a front free end section;
    wherein the second section has an outer diameter being smaller than the outside diameter of the first section at least over one part of the second section length;
    wherein the second section has a first section of constant diameter and is widened conically or frustoconically outwardly from the first section to form a conical or frustoconical free end section; and
    wherein the conical or frustoconical free end section has a plurality of indented radial notches formed within an axial end surface of the conical or frustoconical free end section in a secant manner.

2. The gear unit according to claim 1, further comprising axial indentations on the second section.

3. The gear unit according to claim 1, wherein a number of axial notches that run at least largely in an axial direction are introduced into the second section on a circumferential side.

4. The gear unit according to claim 1, wherein the second section of the pivot bolt includes a section region which has the outer diameter that is reduced in comparison to the outer diameter of the first section between the first pivot section and the front free end section.

5. The gear unit according to claim 1, wherein an outer diameter of the front free end section is smaller or at maximum equal to the outer diameter of the first section of the pivot bolt.

6. The gear unit according to claim 1, wherein the gear wheel is a worm gear.

7. The gear unit according to claim 1, wherein the outer diameter of the second section is less than the outer diameter of the first section by 20% to 30%.

8. The gear unit according to claim 1, wherein the first section of the pivot bolt has a circumferential groove.

9. The gear unit according to claim 1, wherein the radial notches are V-shaped.

* * * * *